United States Patent
Vuyyuri et al.

(10) Patent No.: US 12,307,416 B2
(45) Date of Patent: May 20, 2025

(54) METHODS AND APPARATUS FOR AUTOMATIC ITEM MAPPING USING MACHINE LEARNING PROCESSES

(71) Applicant: Walmart Apollo, LLC, Bentonville, AR (US)

(72) Inventors: Harshada Haribabu Vuyyuri, Telangana (IN); Ketki Aniruddha Gupte, Bangalore (IN); Xiaolin Pang, Saratoga, CA (US); Surya Lakshmi Sujitha Pasumarty, Bentonville, AR (US); Vahid Azizi, Ames, IA (US)

(73) Assignee: Walmart Apollo, LLC, Bentonville, AR (US)

( * ) Notice: Subject to any disclaimer, the term of this patent is extended or adjusted under 35 U.S.C. 154(b) by 341 days.

(21) Appl. No.: 17/589,501

(22) Filed: Jan. 31, 2022

(65) Prior Publication Data

US 2023/0245051 A1    Aug. 3, 2023

(51) Int. Cl.
*G06Q 10/087*    (2023.01)

(52) U.S. Cl.
CPC .................................. *G06Q 10/087* (2013.01)

(58) Field of Classification Search
CPC .... G06Q 10/087; G06Q 30/0623; G06N 3/08; G06F 18/217
USPC ......................................................... 705/28
See application file for complete search history.

(56) References Cited

U.S. PATENT DOCUMENTS 10,217,147 B2 * 2/2019 Shivaswamy ....... G06F 16/9027
10,769,157 B2 * 9/2020 Singh .................... G06F 16/215
10,949,907 B1    3/2021 Jain et al.
2022/0277256 A1 * 9/2022 Mellon ................ G06Q 10/087
2022/0405504 A1 * 12/2022 Malkiel ................ G06V 30/418

FOREIGN PATENT DOCUMENTS

CN    111611484 A1    9/2020
CN    112990177 B1    9/2021

OTHER PUBLICATIONS

DotActive, "Assortment Planning," What is Assortment Planning?, https://www.dotactiv.com/assortment-planning#whatisassortmentplanning, 9 pages.

(Continued)

*Primary Examiner* — Ariel J Yu
*Assistant Examiner* — Denisse Y Ortiz Roman
(74) *Attorney, Agent, or Firm* — Morgan, Lewis & Bockius LLP; Manita Rawat

(57) ABSTRACT

This application relates to employing trained machine learning processes to map items across various domains. For example, a computing device may obtain first textual data for a first item, and second textual data for a second item. The computing device generates a plurality of features based on the first textual data and the second textual data. Further, the computing device inputs the generated plurality of features to a trained machine learning process to generate output data characterizing a textual similarity between the first textual data and the second textual data. The computing device may also determine whether the first item maps to the second item based on the output data. The computing device generates mapping data based on the determination, and stores the mapping data in a data repository.

14 Claims, 9 Drawing Sheets

(56) References Cited

OTHER PUBLICATIONS

A.Vilcek, et al., "At-Scale Transformer-Based Deep Siamese Network for One-Shot Product Matching and Hierarchy Classification", KDD '21 OARSWorkshop.
D. Chicco, et al., Siamese Neural Networks: An Overview, 978-1-0716-0826-5,Springer US,2021, pp. 73-94.
Mikolov, et al., "Efficient estimation of word representations in vector space," 2013.
J. Pennington, et al., "GloVe: Global vectors forword representation," pp. 1532-1543, Oct. 2014.
R. Kiros, et al., "Skip-thought vectors, "CoRR, vol. abs/1506.06726, 2.
Q. Le, et al., "Distributed representations of sentences and documents," ICML'14: Proceedings of the 31st International Conference on International Conference on Machine Learning—vol. 32 Jun. 2014 pp. II-1188-II-1196.
Thyagarajan, "Siamese recurrent architectures for learning sentence similarity," Nov. 2015.
P. Neculoiu, et al., "Learning text similarity with Siamese recurrent networks," Jan. 2016.
J. Devlin, et al., BERT: Pre-training of Deep Bidirectional Transformers for Language Understanding. NAACLHLT (1) 2019: 4171-4186.
Y. Liu, et al., RoBERTa: A Robustly Optimized BERT Pretraining Approach. CoRR abs/1907.11692 (2019).
P. He, et al., "Deberta: Decoding-enhanced bert with disentangled attention," in 2021 International Conference on Learning Representations.
F.A Galatolo, et a;., "Generating images from caption and vice versa via CLIP-Guided Generative Latent Space Search", Improve 2021.
Z. Zheng, et al., "Dual-path Convolutional Image-Text Embeddings with Instance Loss", TOMM, 2020.
Y. Huang, et al., "Instance-aware Image and SentenceMatching with Selective Multimodal LSTM", CVPR2017.
A. Rubio, et al., "Multi-modal joint embedding for fashion product retrieval", 10.1109/ICIP.2017.8296311.
O. Jafari, et al., "A Survey on Locality Sensitive Hashing Algorithms and their Applications", CoRR abs/2102.08942, 2021.
B. Bahmani, et al., "Efficient Distributed Locality Sensitive Hashing", CIKM '12: Proceedings of the 21st ACM International conference on Information and knowledge management, pp. 2174-2178, https://doi.org/10.1145/2396761.2398596.
Inserting and Querying Simhashes https://github.com/seomoz/simhashdb-py.
S. R. G. J. Lake, et al., "One shot learning of simple visual concepts.," in Proceedings of the 33rd Annual Conference of the Cognitive Science Society, vol. 172, 2011.
S. Chopra, et al., "Learning a similarity metric discriminatively, with application to face verification," vol. 1, pp. 539-546 vol. 1, 2005.
H.-F. Yu, et al., "Product title classification versus text classification," 2012.
Z. Kozareva, et al., "Recognizing salient entities in shopping queries," pp. 107-111, Aug. 2016.
J.-W. Ha, et al., "Large-scale item categorization in e-commerce using multiple recurrent neural networks," Aug. 2016.
Y. Xia, et al., "Large-scale categorization of Japanese product titles using neural attention models," in Proceedings of the 15th Conference of the European Chapter of the Association for Computational Linguistics: vol. 2, Short Papers, (Valencia, Spain), pp. 663-668, Association for Computational Linguistics, Apr. 2017.
K. Shah, et al., "Neural network based extreme classification and similarity models for product matching," in Proceedings of the 2018 Conference of the North American Chapter of the Association for Computational Linguistics: Human Language Technologies, vol. 3 (Industry Papers), (New Orleans—Louisiana), pp. 8-15, Association for Computational Linguistics, Jun. 2018.

\* cited by examiner

METHODS AND APPARATUS FOR AUTOMATIC ITEM MAPPING USING MACHINE LEARNING PROCESSES

TECHNICAL FIELD

The disclosure relates generally to machine learning processes and, more specifically, to automatically mapping items across various domains using machine learning processes.

BACKGROUND

Retailers typically maintain inventory of products they sell. For example, a retailer may maintain a catalog that identifies products they sell in stores or online. At the same time, retailers may also receive product information from third-parties, such as manufacturers or retail data providers. The retailers may use the third-party product information to determine whether to provide additional items for sale (e.g., for assortment growth), or to substitute existing items for sale with other items, for example. In some examples, retailers may receive product information from third-party sellers that wish to sell items through the retailer (e.g., either a store location of the retailer or the retailer's website). The various sources of product information, including from a retailer's own internal catalog and third-party product information, may not identify the same product similarly. For example, product identification numbers, product descriptions, and even product images may differ. As such, retailers may not match same items across these and other sources of product information. As a result, retailers may purchase duplicate items, fail to increase or decrease their product offerings as intended, and may lose out on additional sales, among other drawbacks.

SUMMARY

The embodiments described herein are directed to using trained machine learning processes to map items across various domains, such as various inventory and catalog systems. The embodiments may include generating features from textual data for an item. The textual data may include, for example, an item name, an item brand, an item category, an item description, or any other suitable textual data. The embodiments may further include applying trained machine learning processes to the generated features to generate output data characterizing a textual similarity between items. For example, the more similar the textual data between two items is, the higher the textual similarity is between the two items. The trained machine learning processes may include, for example, a trained Siamese Bidirectional Encoder Representations from Transformers (BERT) network, such as a Siamese Sentence-BERT (SBERT) Bi-Encoder or Siamese SBERT Cross-Encoder. Based on the determined textual similarity, the embodiments may include mapping one item to another, such as to indicate they are the same item. Further, the machine learning processes may be trained based on features generated from textual data for a plurality of items, such as unlabeled textual data, positively labelled textual data, and negatively labelled textual data.

Among other advantages, the embodiments may allow a retailer to map items across various domains. For example, the embodiments may allow a retailer to more accurately determine whether an item is already included in the retailer's offerings. For instance, the retailer may map an item from a manufacturer or third-party seller to an item being sold on the retailer's website or in-store. Likewise, the embodiments may allow the retailer to determine that the item is currently not offered for sale by the retailer, and thus may allow the retailer to expand their offerings by selling the item. As such, the embodiments may allow retailers to decrease costs associated with selling similar items, as well as to increase sales, including in-store and online sales, when they expand their offerings. Further, the embodiments may allow retailers to more reliably manage their inventory. Persons of ordinary skill in the art having the benefit of these disclosures would recognize these and other benefits as well.

In accordance with various embodiments, exemplary systems may be implemented in any suitable hardware or hardware and software, such as in one or more suitable computing devices. For example, in some embodiments, a computing device (e.g., server) comprising at least one processor obtains first textual data for a first item. The computing device also obtains second textual data for a second item. The computing device generates a plurality of features based on the first textual data and the second textual data. Further, the computing device inputs the generated plurality of features to a trained machine learning process to generate output data characterizing a textual similarity between the first textual data and the second textual data. The computing device also determines whether the first item maps to the second item based on the output data. The computing device generates mapping data based on the determination, and stores the mapping data in a data repository.

In some embodiments, a method by at least one processor includes obtaining first textual data for a first item. The method also includes obtaining second textual data for a second item. The method includes generating a plurality of features based on the first textual data and the second textual data. Further, the method includes inputting the generated plurality of features to a trained machine learning process to generate output data characterizing a textual similarity between the first textual data and the second textual data. The method also includes determining whether the first item maps to the second item based on the output data. The method includes generating mapping data based on the determination, and storing the mapping data in a data repository.

In some embodiments, a non-transitory computer readable medium has instructions stored thereon. The instructions, when executed by at least one processor, cause a device to perform operations that include obtaining first textual data for a first item. The operations also include obtaining second textual data for a second item. The operations include generating a plurality of features based on the first textual data and the second textual data. Further, the operations include inputting the generated plurality of features to a trained machine learning process to generate output data characterizing a textual similarity between the first textual data and the second textual data. The operations also include determining whether the first item maps to the second item based on the output data. The operations include generating mapping data based on the determination, and storing the mapping data in a data repository.

In some embodiments, a computing device comprising at least one processor obtains unlabeled textual data for a first plurality of items, positively labelled textual data for a second plurality of items, and negatively labelled textual data for a third plurality of items. The computing device also generates a plurality of features based on the unlabeled textual data, the positively labelled textual data, and the negatively labelled textual data. Further, the computing device trains a machine learning process to generate output data characterizing textual similarity based on the generated features.

In some embodiments, a method by at least one processor includes obtaining unlabeled textual data for a first plurality of items, positively labelled textual data for a second plurality of items, and negatively labelled textual data for a third plurality of items. The method also includes generating a plurality of features based on the unlabeled textual data, the positively labelled textual data, and the negatively labelled textual data. Further, the method includes training a machine learning process to generate output data characterizing textual similarity based on the generated features.

In some embodiments, a non-transitory computer readable medium has instructions stored thereon. The instructions, when executed by at least one processor, cause a device to perform operations that include obtaining unlabeled textual data for a first plurality of items, positively labelled textual data for a second plurality of items, and negatively labelled textual data for a third plurality of items. The operations also include generating a plurality of features based on the unlabeled textual data, the positively labelled textual data, and the negatively labelled textual data. Further, the operations include training a machine learning process to generate output data characterizing textual similarity based on the generated features.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
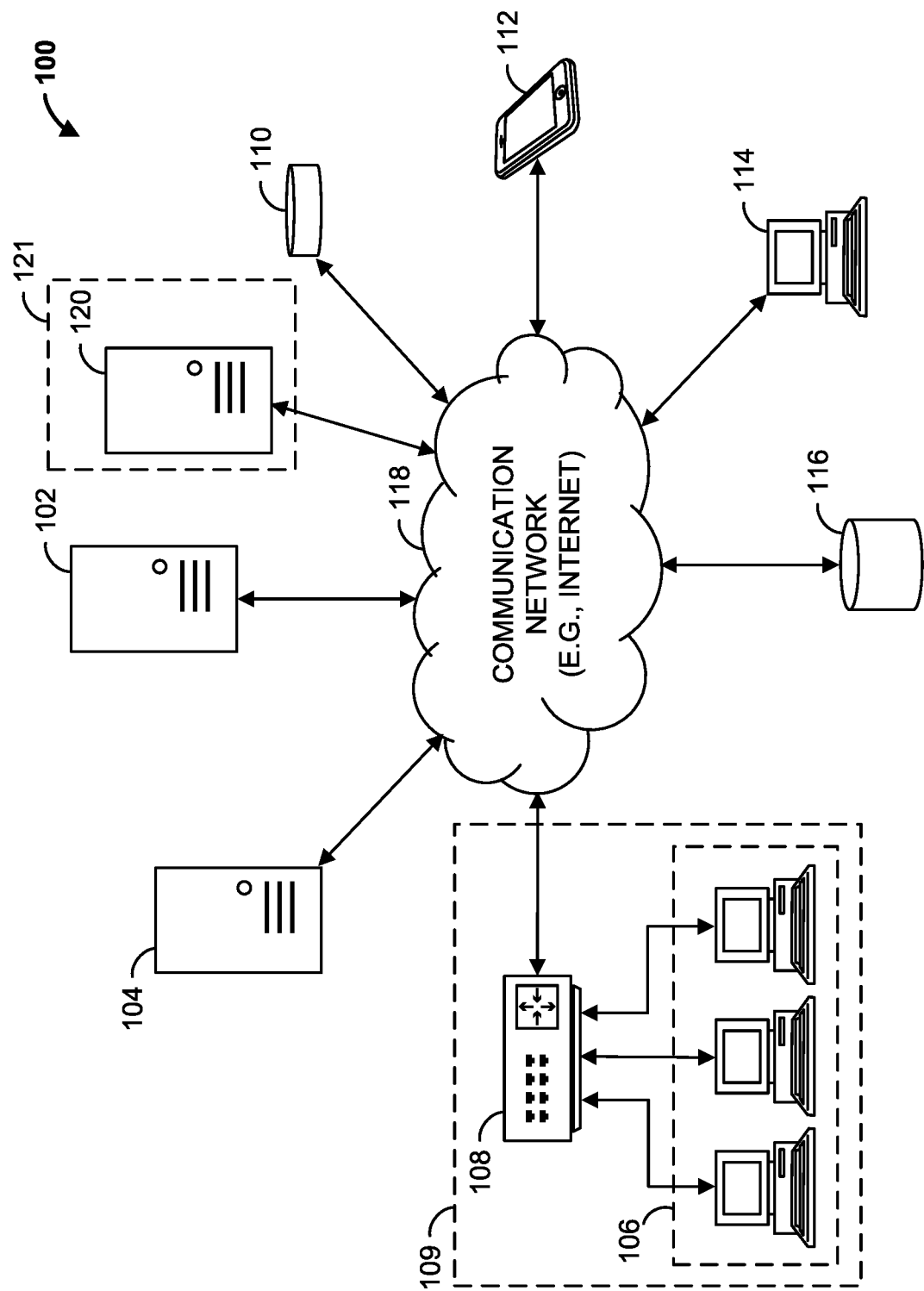
FIG. 1 is a block diagram of an item mapping system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The embodiments employ machine learning processes to determine whether two or more items are similar. For example, the machine learning processes may be trained using features generated from textual information from an internal item catalog. Once trained, the machine learning processes may be applied to features generated from textual information for two or more items to determine if those items are similar. For example, the trained machine learning processes may be applied to features generated from textual information for an item to determine if that item is already part of a retailer's offerings.

Turning to the drawings, FIG. 1 illustrates a block diagram of an item mapping system 100 that includes item mapping computing device 102 (e.g., a server, such as an application server), web server 104, workstation(s) 106, database 116, third-party server 120, and multiple customer computing devices 110, 112, 114 operatively coupled over network 118. Item mapping computing device 102, workstation(s) 106, web server 104, third-party server 120, and multiple customer computing devices 110, 112, 114 can each be any suitable computing device that includes any hardware or hardware and software combination for processing data. For example, each of item mapping computing device 102, web server 104, workstations 106, and multiple customer computing devices 110, 112, 114 can include one or more processors (e.g., each processor including one or more processing cores), one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, each of item mapping computing device 102 and third-party server 120 can be a computer, a workstation, a laptop, a server such as a cloud-based server, a distributed computing system, or one or more of any other suitable device. Each of multiple customer computing devices 110, 112, 114 can be a mobile device such as a cellular phone, a laptop, a computer, a table, a personal assistant device, a voice assistant device, a digital assistant, or any other suitable device.

Although FIG. 1 illustrates three customer computing devices 110, 112, 114, item mapping system 100 can include any number of customer computing devices 110, 112, 114. Similarly, item mapping system 100 can include any number of workstation(s) 106, item mapping computing devices 102, third-party servers 120, web servers 104, and databases 116.

Workstation(s) 106 are operably coupled to communication network 118 via router (or switch) 108. Workstation(s) 106 and/or router 108 may be located at a store 109, for example. In some examples, workstation 106 is a register at store 109. Workstation(s) 106 can communicate with item mapping computing device 102 over communication network 118. The workstation(s) 106 may send data to, and receive data from, item mapping computing device 102. For example, the workstation(s) 106 may transmit data related to a transaction, such as a purchase transaction, to item mapping computing device 102. Workstation(s) 106 may also communicate with web server 104. For example, web server 104 may host one or more web pages, such as a retailer's website. Workstation(s) 106 may be operable to access and program (e.g., configure) the webpages hosted by web server 104 through, for example, an Application Programming Interface (API).

Database 116 can be a remote storage device, such as a cloud-based server, a memory device on another application server, a networked computer, or any other suitable remote storage. Item mapping computing device 102 is operable to communicate with database 116 over communication network 118. For example, item mapping computing device 102 can store data to, and read data from, database 116. For instance, item mapping computing device 102 may store catalog information for a plurality of items, such as items sold at store 109 or on a website hosted by web server 104, within database 116. The catalog information can include, for each of the items, one or more of an item name, and item brand, an item price, an item description, an item category, or any other item attribute or information. Although shown remote to item mapping computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, an operator of one of multiple computing devices 110, 112, 114 may access the web page hosted by web server 104, add one or more items to an online shopping cart of the web page, and perform an online checkout of the shopping cart to purchase the items.

Third-party server 120 may provide third-party data, such as information about items. For example, a third-party 121, such as a merchant, manufacturer, third-party seller, or a distributor, may maintain a catalog of items within third-party server 120. In some instances, third-party server 120 transmits information regarding items, such as new items, that a retailer may offer to sell. For example, third-party server 120 may transmit a list of items, along with corresponding item information about each item, to item mapping computing device 102. In some examples, item mapping computing device 102 generates features based on at least portions of the item information and additional item information of an item in the retailer's catalog, and applies trained machine learning processes to the generated features to generate output data characterizing a textual similarity between the item in the retailer's catalog and the received items.

Generating Item Similarity Predictions

Item mapping computing device 102 may map features generated from item data, such as product descriptions, to output data. For instance, item mapping computing device 102 may apply a trained machine learning process, such as a trained Sentence-BERT (SBERT) model, to features generated from product descriptions to generate output data. In some examples, item mapping computing device 102 generates first features from item data from a retailer's catalog data and second features from item data received from third-party server 120, and applies the trained machine learning process to the generated first features and the second features to generate the output data. The trained SBERT model may be, for example, an SBERT Bi-Encoder model, or an SBERT Cross-Encoder model. In other examples, the model may be a Doc2Vec model.

For example, the output data may include a similarity score characterizing a similarity between two items. The item mapping computing device 102 may determine whether the similarity score satisfies a predetermined threshold (e.g., whether the similarity score is above the predetermined threshold). If the similarity score satisfies the predetermined threshold (e.g., is above the predetermined threshold), item mapping computing device 102 may determine that the items are similar (e.g., it's the same item), and generate data identifying the items as similar.

If, however, the similarity score does not satisfy the predetermined threshold, item mapping computing device 102 may determine whether a first attribute of the items is similar. For example, item mapping computing device 102 may determine a string similarity between the brands of the items. In some examples, item mapping computing device 102 applies a Doc2Vec model to determine the string similarity. If the string similarity of the first attribute of the items does not satisfy a first attribute threshold, item mapping computing device 102 may determine that the items are not the same, and may generate data identifying the items as different. For example, the generated data may indicate that the brands of the items are different.

If, however, the string similarity of the first attribute of the items satisfies the first attribute threshold, item mapping computing device 102 may determine whether a second attribute of the items is similar. For example, item mapping computing device 102 may determine a string similarity between the item descriptions of the items by applying, for example, a Doc2Vec model to the item descriptions. If the string similarity of the second attribute of the items satisfies a second attribute threshold, item mapping computing device 102 may determine that the items are similar, and may generate the data identifying the items as similar. Otherwise, if the string similarity of the second attribute does not satisfy the second attribute threshold, item mapping computing device 102 may determine that the items are not the same, and may generate the data identifying the items as different. For example, the generated data may indicate that the brands of the items are different.

Training the Machine Learning Processes

The machine learning processes, such as the trained Siamese SBERT model, may be trained based on features generated from a retailer's catalog of item data. The item data may include, for each item, one or more of an item brand, item type, item category, item description, or any other item data, as described herein. For example, item mapping computing device 102 may aggregate item data to generate up to three stratified item data sets including a training data set, a testing data set, and a validation data set. Item mapping computing device 102 may generate features based on the training data set, and input the generated features to the Siamese SBERT model to have the Siamese SBERT model learn to map input features to output data characterizing a textual similarity between the input features. The training data set may include, for example, positively labelled data, anchor data, and negatively labelled data.

In some examples, the machine learning process is trained until at least one metric threshold is satisfied. For example, the machine learning process (e.g., SBERT model) may be trained until a loss, such as a mean squared error (MSE) loss, is minimized over the training data set. For example, and during fine-tuning, the weights of the model may be adjusted until the at least one metric threshold is satisfied (e.g., until the at least one metric is below a threshold).

Further, item mapping computing device 102 may generate features based on the testing data set, which may include no item data for items in the training data set, and may apply the Siamese SBERT model to the generated features for pairs of items to generate output data characterizing a textual similarity between the items. Item mapping computing device 102 may determine a ranking loss (e.g., triplet ranking loss) based on the output data, and may determine whether the ranking loss satisfies a predetermined threshold. If the ranking loss fails to satisfy the predetermined threshold (e.g., the ranking loss is above the predetermined threshold), item mapping computing device 102 may generate an additional training data set and testing data set to continue training the Siamese SBERT model.

If, however, the ranking loss does satisfy the predetermined threshold, (e.g., the ranking loss is at or below the predetermined threshold), item mapping computing device 102 may generate features based on the validation set, which fails to include item data for items of the training data set or testing data set, in some examples. Item mapping computing device 102 may apply the Siamese SBERT model to the generated features for pairs of items to generate output data characterizing a textual similarity between the items. Item mapping computing device 102 may determine a ranking loss (e.g., triplet ranking loss) based on the output data, and may determine whether the ranking loss satisfies a predetermined threshold. If the ranking loss fails to satisfy the predetermined threshold (e.g., the ranking loss is above the predetermined threshold), item mapping computing device 102 may generate an additional training data set, testing data set, and validation testing set to continue training the Siamese SBERT model.

Once trained, item mapping computing device 102 may store the machine learning model parameters (e.g., hyperparameters, configuration settings, weights, etc.) associated with the machine learning process within database 116. As such, during inference, item mapping computing device 102 may obtain the parameters from database 116, configure the machine learning model with or based on the obtained parameters, and execute the machine learning model accordingly.

Figure 2:
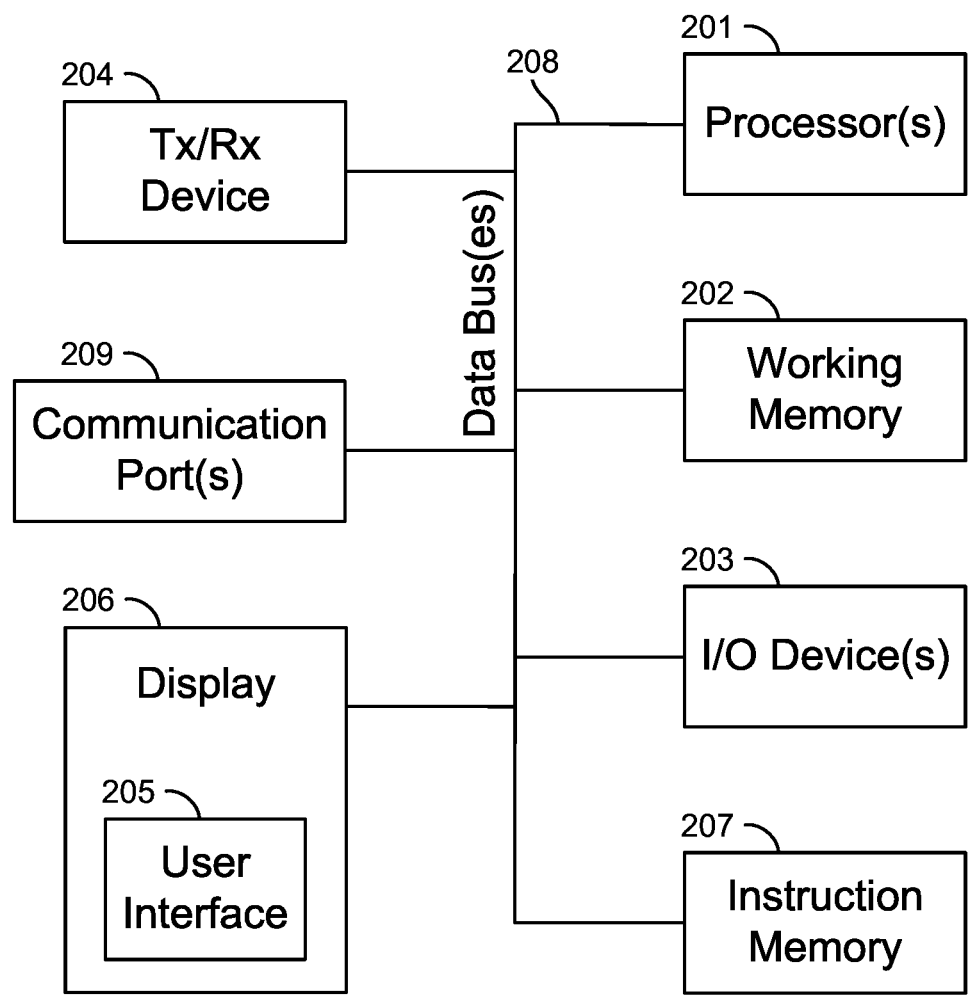
FIG. 2 is a block diagram of an exemplary item mapping computing device in accordance with some embodiments.

FIG. 2 illustrates an exemplary item mapping computing device 102 of FIG. 1. Item mapping computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can store instructions that, when executed by one or more processors 201, cause the one or more processors 201 to perform any of the operations described herein, including training and executing any of the machine learning processes described herein. Instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of item mapping computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as training data.

Display 206 can display user interface 205. User interfaces 205 can enable user interaction with item mapping computing device 102. For example, user interface 205 can be a user interface for an application of a retailer that allows a customer to purchase one or more items from the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 item mapping computing device 102 will be operating in. Processor(s) 201 is operable to receive data from, or send data to, a network, such as communication network 118 of FIG. 1, via transceiver 204.

Figure 3:
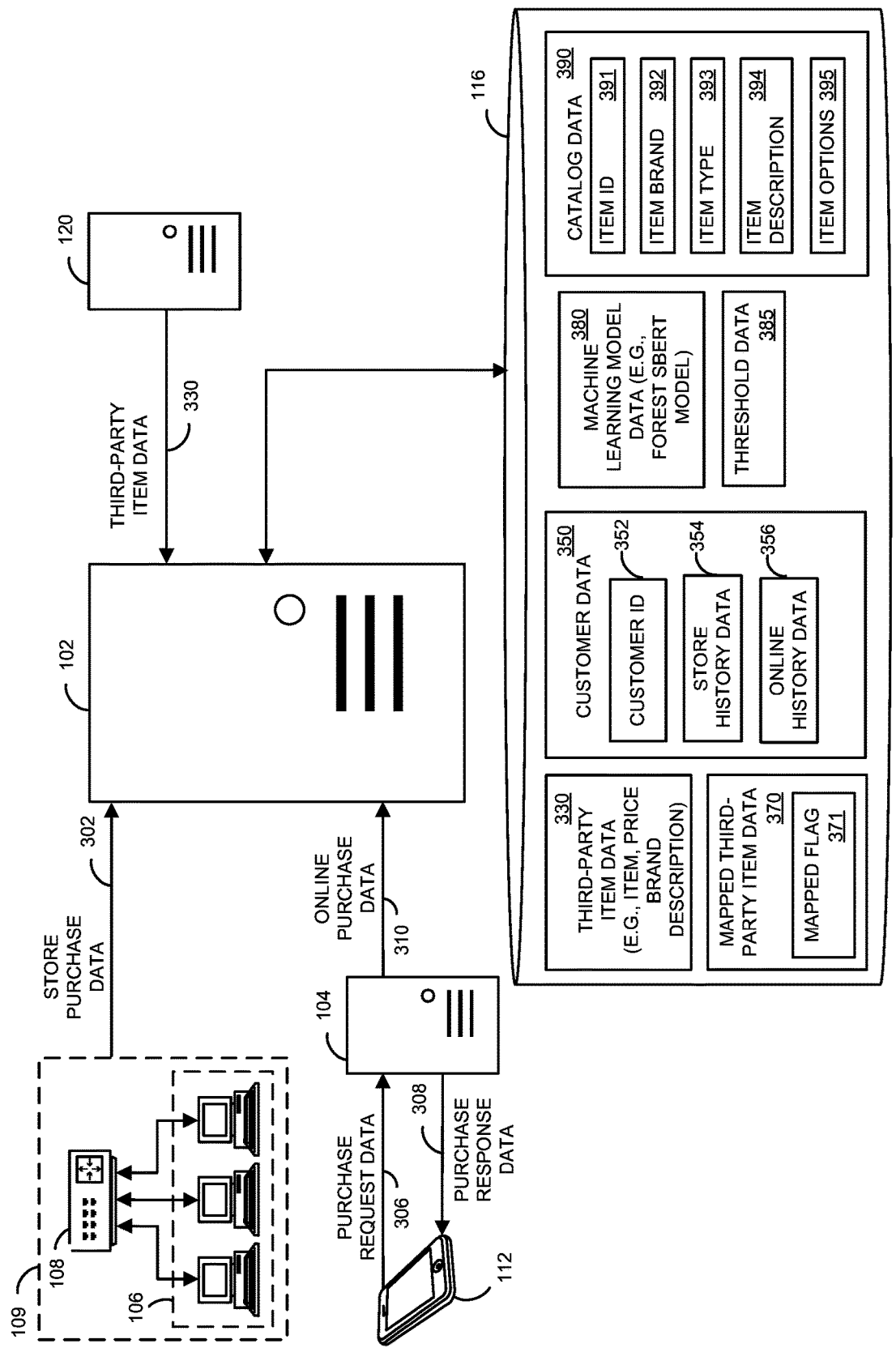
FIG. 3 is a block diagrams illustrating examples of various portions of the item mapping system of FIG. 1 in accordance with some embodiments.

FIG. 3 is a block diagram illustrating examples of various portions of the item mapping system of FIG. 1. In this example, database 116 stores catalog data 390, which may include a catalog of items sold at one or more stores 109 and items sold online. For example, catalog data 390 may include, for each item, an item identifier (ID) 391 (e.g., UPC number, SKU number, etc.), an item brand 392, an item type 393 (e.g., lawn mower, house cleaner, food item, etc.), an item description 394, and item options 395 (e.g., color, size, amount, etc.). Database 116 also stores machine learning model data 380, which may store machine learning model parameters (e.g., hyperparameters, configuration settings, weights, etc.) of a trained machine learning model process, such as the SBERT models described herein. For example, machine learning model data 380 may include machine learning model parameters of a trained Siamese SBERT Bi-Encoder model. As described herein, item mapping computing device 102 can retrieve machine learning model data 380 from database 116 to configure a machine learning process to generate, during inference, output data characterizing a textual similarity between two items based on textual information for the two items.

Item mapping computing device 102 can receive from a store 109 (e.g., from a computing device, such as workstation 106, at store 109) store purchase data 302 identifying the purchase of one or more items. Store purchase data 302 may include, for example, one or more of the following: an identification of one or more items being purchased; a price of each item being purchased; an identification of the customer (e.g., customer ID, passport ID, driver's license number, etc.); a method of payment (i.e., payment form) used to purchase the items (e.g., credit card, cash, check); a Universal Product Code (UPC) number for each item; a time and/or date; and/or any other data related to the purchase transaction.

Item mapping computing device 102 may parse store purchase data 302 and extract data associated with the purchase, and store the extracted data within database 116. For example, item mapping computing device 102 may store the extracted information, which may include one or more of the item IDs, item prices, customer ID, payment form, and item UPC numbers, as customer data 350 within database 116. For instance, customer data 350 may include, for each of a plurality of customers, a customer ID 352 which characterizes one or more customer IDs, and corresponding store history data 354, which may include one or more of the item IDs, item prices, customer ID, payment form, and item UPC numbers for each purchase at store 109.

Similarly, item mapping computing device 102 can receive from a web server 104, such as a web server hosting a retailer's website, online purchase data 310 identifying the purchase of one or more items from the website. For example, web server 104 may receive purchase request data 306 from customer computing device 112, where purchase request data 306 identifies a request to purchase one or more items from a website, such as a retailer's website. Web server 104 may generate online purchase data 310 based on purchase request data 306. For example, online purchase data 310 may include one or more of the following: an identification of one or more items being purchased; a price of each item being purchased; an identification of the customer (e.g., customer ID, passport ID, driver's license number, etc.); a method of payment (i.e., payment form) used to purchase the items (e.g., credit card, cash, check); a Universal Product Code (UPC) number for each item; a time and/or date; and/or any other data related to the purchase transaction. Web server 104 may process purchase request data 104 to establish the purchase of the items, and may generate purchase response data 308 confirming the purchase of the items, and may transmit purchase response data 308 to customer computing device 112. Moreover, web server 104 may generate online purchase data 310 characterizing the purchase, and may transmit online purchase data 310 to item mapping computing device 102. For example, online purchase data 310 may include one or more of: a customer ID, one or more item IDs, one or more item prices, payment form, and one or more item UPC numbers.

Item mapping computing device 102 may parse online purchase data 310 and extract data associated with the purchase, and store the extracted data within database 116. For example, item mapping computing device 102 may store the extracted information, which may include one or more of the item IDs, item prices, customer ID, payment form, and item UPC numbers, as customer data 350 within database 116. For instance, customer data 350 may include, for each of a plurality of customers, a customer ID 352 which characterizes one or more customer IDs, and corresponding online history data 356, which may include one or more of the item IDs, item prices, item description, customer ID, payment form, item UPC numbers, and delivery time (e.g., a scheduled, or actual, delivery time) for each purchase on the website hosted by web server 104.

Item mapping computing device 102 may apply the trained machine learning processes described herein to determine whether one or more items identified by customer data 350 (e.g., store history data 354, online history data 356) are similar to any one or more items identified by catalog data 390. For example, item mapping computing device 102 may generate features based on an item description for a first item identified within customer data 350, and may generate additional features based on an item description of each of one or more second items identified within catalog data 390. The features may include, for example, sentence embeddings. Item mapping computing device 102 may apply a trained Siamese SBERT model to the sentence embeddings to generate output data characterizing a similarity score indicating a textual similarity between the first item and each of the second items. Based on the similarity scores, item mapping computing device 102 may map the first item to one of the second items. For example, item mapping computing device 102 may compare the similarity score to a predefined threshold, such as a predefined threshold identified by threshold data 385 stored within database 116. Threshold data 385 may further include attribute thresholds, as described herein (e.g., the first attribute threshold and the second attribute threshold). If the similarity score corresponding to a second item satisfies the predetermined threshold, item mapping computing device 102 may map the first item to the second item. In some examples, maps the first item to the second item with the highest similarity score that satisfies the predetermined threshold.

In some examples, item mapping computing device 102 generates data identifying the mapping, and stores the generated data within customer data 350. For example, item mapping computing device 102 may generate mapping data identifying that the first item is mapped to the corresponding second item of the catalog data 390.

In some examples, item mapping computing device 102 receives third-party item data 330 from third-party server 120. As described herein, third-party item data 330 may include textual information about one or more items. For example, third-party item data 300 may include one or more of an item ID, an item brand, an item type, and item description, and item options for each item. Item mapping computing device 102 may store third-party item data 330 within database 116.

Item mapping computing device 102 may apply the trained machine learning processes described herein to determine whether one or more items identified by third-party item data 330 are similar to any one or more items identified by catalog data 390. For example, item mapping computing device 102 may generate features based on an item description for a first item identified within third-party item data 330, and may generate additional features based on an item description of each of one or more second items identified within catalog data 390. The features may include, for example, sentence embeddings. Item mapping computing device 102 may apply a trained Siamese SBERT model to the sentence embeddings to generate output data characterizing a similarity score indicating a textual similarity between the first item and each of the second items.

Based on the similarity scores, item mapping computing device 102 may map the first item to one of the second items. For example, item mapping computing device 102 may compare the similarity score to a predefined threshold, such as a predefined threshold identified by threshold data 385 stored within database 116. If the similarity score corresponding to a second item satisfies the predetermined threshold, item mapping computing device 102 may map the first item to the second item. In some examples, maps the first item to the second item with the highest similarity score that satisfies the predetermined threshold.

In some examples, item mapping computing device 102 generates data identifying the mapping, and stores the generated data within customer data 350. For example, item mapping computing device 102 may generate mapped third-party item data 370 identifying that whether the first item is mapped to a corresponding second item of the catalog data 390, and store mapped third-party item data 370 within database 116. For instance, mapped third-party item data 370 may include, for a third-party item, a mapped flag 371 indicating whether the third-party item has been mapped to an item within catalog data 390.

Figure 4:
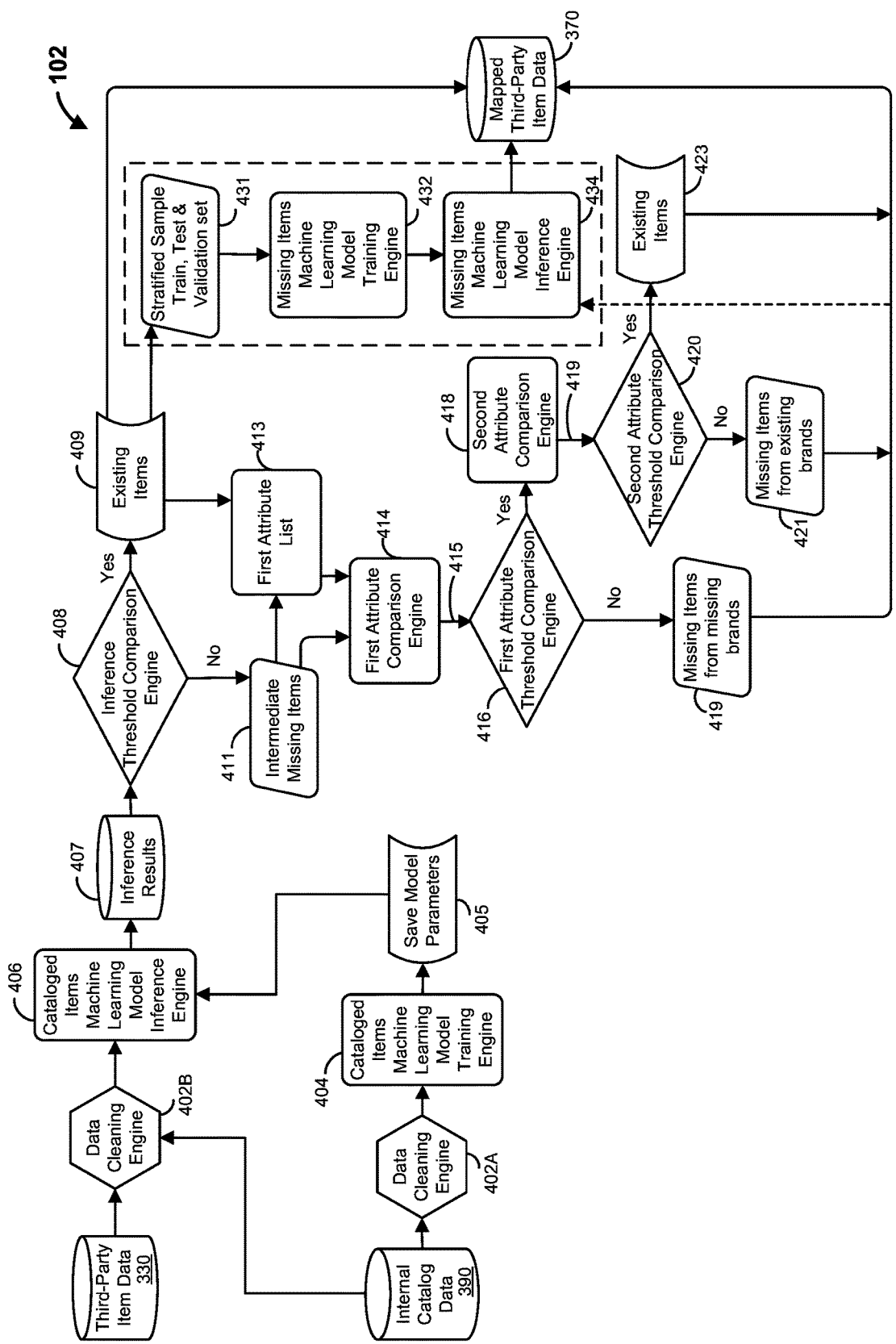
FIG. 4 is a block diagram illustrating various portions of the item mapping computing device of FIG. 1 in accordance with some embodiments.

FIG. 4 illustrates exemplary portions of item mapping computing device 102 that employ trained machine learning processes to map items, such as items identified within third-party item data 330, to cataloged items, such as items identified within catalog data 390.

In this example, data cleaning engine 402A receives and parses catalog data 390 (e.g., from database 116) characterizing textual information for one or more items, and generates at least three stratified data sets including a training data set, a testing data set, and a validation data set. Further, data cleaning engine 402A may generate features (e.g., sentence embeddings) for each of the training data set, testing data set, and validation set. The training data set may include, for example, positively labelled data, anchor data, and negatively labelled data. Each of the testing data set and the validation set may include features generated from textual information for items not part of the other data set. For example, data cleaning engine 402A may randomly sample catalog data 390 to determine first items from which to generate the features for the testing data set. Further, data cleaning engine 402A may again randomly sample catalog data 390, but only include a sampled item in the validation data set if the item is not part of the testing data set (e.g., based on comparing item IDs).

Data cleaning engine 402A may provide the features generated for each of the data sets to cataloged items machine learning model training engine 404 to train a machine learning process, such as the Siamese SBERT model described herein. For example, cataloged items machine learning model training engine 404 may input sentence embeddings generated for a pair of items from the training data set to the Siamese SBERT model to have the model learn to map the sentence embeddings to output data characterizing a textual similarity between the sentence embeddings. For example, the Siamese SBERT model may adjust its weights such as to generate output data characterizing a larger difference in textual similarity between the positively labelled data and the anchor data, than between the negatively labelled data and the anchor data.

In some examples, data cleaning engine 402A trains the Siamese SBERT model until at least one metric threshold is satisfied. For example, data cleaning engine 402A may train the Siamese SBERT model until a loss, such as a mean squared error (MSE) loss, is minimized over the training data set. For example, during the training the weights of the model may adjust until the at least one metric threshold is satisfied (e.g., until the at least one metric is below a threshold).

Once training with the training data set is complete, cataloged items machine learning model training engine 404 may apply the Siamese SBERT model to the features generated from items of the testing data set to generate output data characterizing a textual similarity between the items. Further, cataloged items machine learning model training engine 404 may determine a ranking loss based on the output data, and may determine whether the ranking loss satisfies a predetermined threshold. If the ranking loss fails to satisfy the predetermined threshold (e.g., the ranking loss is above the predetermined threshold), data cleaning engine 402A may generate an additional training data set and testing data set to provide to cataloged items machine learning model training engine 404 to continue training the Siamese SBERT model.

If, however, the ranking loss does satisfy the predetermined threshold, (e.g., the ranking loss is at or below the predetermined threshold), cataloged items machine learning model training engine 404 may apply the Siamese SBERT model to the generated features for pairs of items from the validation data set to generate output data characterizing a textual similarity between the items. Cataloged items machine learning model training engine 404 may determine a ranking loss based on the output data, and may determine whether the ranking loss satisfies a predetermined threshold. If the ranking loss fails to satisfy the predetermined threshold (e.g., the ranking loss is above the predetermined threshold), data cleaning engine 402A may generate an additional training data set, testing data set, and validation data set to provide to cataloged items machine learning model training engine 404 to continue training the Siamese SBERT model.

Once the Siamese SBERT model is trained, cataloged items machine learning model training engine 404 stores the model parameters 405 in a data repository, such as within database 116.

Cataloged items machine learning model inference engine 406 may obtain the saved model parameters 405, and may configure the Siamese SBERT model based on the obtained model parameters for inference. For example, data cleaning engine 402B may receive third-party item data 330 (e.g., from database 116), and may generate features based on textual information corresponding to a third-party item. For example, data cleaning engine 402B may generate sentence embeddings based on item descriptions identified by the third-party item data 330, and may generate additional sentence embeddings based on an item description of one or more items stored within catalog data 390. Data cleaning engine 402B may provide the sentence embeddings and additional sentence embeddings to cataloged items machine learning model inference engine 406. Cataloged items machine learning model inference engine 406 may apply the trained Siamese SBERT model to the generated features to generate inference results 407, which characterize a textual similarity between the sentence embeddings and additional sentence embeddings. For example, the inference results 407 may include a similarity score characterizing the similarity between the sentence embeddings and additional sentence embeddings.

Inference threshold comparison engine 408 may receive the inference results 407, and may compare the similarity score to a predetermined threshold (e.g., a predetermined threshold identified by threshold data 390). If the similarity score satisfies the predetermined threshold (e.g., is above the predetermined threshold), Inference threshold comparison engine 408 may determine that the items are similar (e.g., it's the same item), and generate existing item data 409 identifying the items as the same, and thus the third-party item is "existing" (e.g., already part of catalog data 390). Inference threshold comparison engine 408 may store the existing items data 409 as mapped third-party item data 370 (e.g., with mapped flag 371 indicating that the item was mapped).

If, however, the similarity score does not satisfy the predetermined threshold, inference threshold comparison engine 408 generates intermediate missing items data 411, indicating that the item has not been mapped. First attribute comparison engine 414 may receive the intermediate missing items data 411, and may determine whether a first attribute of third-party item is similar to one or more predetermined first attributes. For example, first attribute comparison engine 414 may generate first attribute data 415 characterizing a string similarity between a brand of the third-party item, and at least one attribute of a maintained first attribute list 413. First attribute list 413 may identify, for example, the top selling brands in a same category of the third-party item. First attribute comparison engine 414 may generate a string similarity for each of the top selling brands, and may generate first attribute data 415 characterizing the most similar brand (e.g., the brand with the highest similarity to the third-party item brand). In some examples, first attribute comparison engine 414 applies a Doc2Vec model to the brands to determine the string similarity. Further, first attribute threshold comparison engine 416 receives the first attribute data 415, and compares the first attribute data 415 to a first attribute threshold (e.g., a predetermined first attribute threshold identified by threshold data 390).

If the string similarity of the first attribute of the items does not satisfy the first attribute threshold, first attribute threshold comparison engine 416 generates missing items from missing brands data 419 data identifying the items as different. For example, the generated missing items from missing brands data 419 may indicate that the brands of the items are different. Further, first attribute threshold comparison engine 416 may store the missing items from missing brands data 419 as mapped third-party item data 370 (e.g., with mapped flag 371 indicating that the item was not mapped).

If, however, the string similarity of the first attribute of the items satisfies the first attribute threshold, second attribute comparison engine 418 may determine whether a second attribute of the items is similar. For example, second attribute comparison engine 418 may generate second attribute data 419 characterizing a string similarity between the item descriptions of the items. In some examples, second attribute comparison engine 418 applies a Doc2Vec model to the item descriptions to determine the string similarity. Further, second attribute threshold comparison engine 420 may receive the second attribute data 419, and may compare the second attribute data 419 to a second attribute threshold (e.g., a predetermined second attribute threshold identified by threshold data 390).

If the string similarity of the second attribute of the items satisfies the second attribute threshold, second attribute threshold comparison engine 420 may determine that the items are similar, and may generate existing items data 423 characterizing the items as the same, and thus the third-party item as "existing" (e.g., already part of catalog data 390). Second attribute threshold comparison engine 420 may store the existing items data 423 as mapped third-party item data 370 (e.g., with mapped flag 371 indicating that the item was mapped).

Otherwise, if the string similarity of the second attribute does not satisfy the second attribute threshold, second attribute threshold comparison engine 418 may determine that the items are not the same, and may generate missing items from existing brands data 421 identifying the items as different. For example, the generated missing items from existing brands data 421 may indicate that the brands and/or or the item descriptions of the items are different. Further, second attribute threshold comparison engine 418 may store the missing items from missing brands data 419 as mapped third-party item data 370 (e.g., with mapped flag 371 indicating that the item was not mapped).

In some examples, the machine learning processes described herein are trained, or re-trained, based on textual information for existing items 409. For example, data cleaning engine 402A may generate a stratified training, testing, and validation data set 431 as described herein based on textual information for existing items 409. Further, data cleaning engine 402A may generate features on each of the data sets as described herein, and provide the features to missing items machine learning model training engine 432. Missing items machine learning model training engine 432 may train the Siamese SBERT model based on the generated features of the training data set, and then apply the initially trained Siamese SBERT model to each of the testing data set and validation data set as described herein to determine whether the Siamese SBERT model is sufficiently trained (or re-trained).

In some examples, one or more of data cleaning engine 402A, data cleaning engine 402B, cataloged items machine learning model training engine 404, cataloged items machine learning model inference engine 406, inference threshold comparison engine 408, first attribute comparison engine 414, first attribute threshold comparison engine 416, second attribute comparison engine 418, second attribute threshold comparison engine 420, missing items machine learning model training engine 432, and missing items machine learning model inference engine 434 may be implemented in hardware. In some examples, one or more of data cleaning engine 402A, data cleaning engine 402B, cataloged items machine learning model training engine 404, cataloged items machine learning model inference engine 406, inference threshold comparison engine 408, first attribute comparison engine 414, first attribute threshold comparison engine 416, second attribute comparison engine 418, second attribute threshold comparison engine 420, missing items machine learning model training engine 432, and missing items machine learning model inference engine 434 may be implemented as an executable program maintained in a tangible, non-transitory memory, such as instruction memory 207 of FIG. 2, which may be executed by one or processors, such as processor 201 of FIG. 2.

Figure 5A:
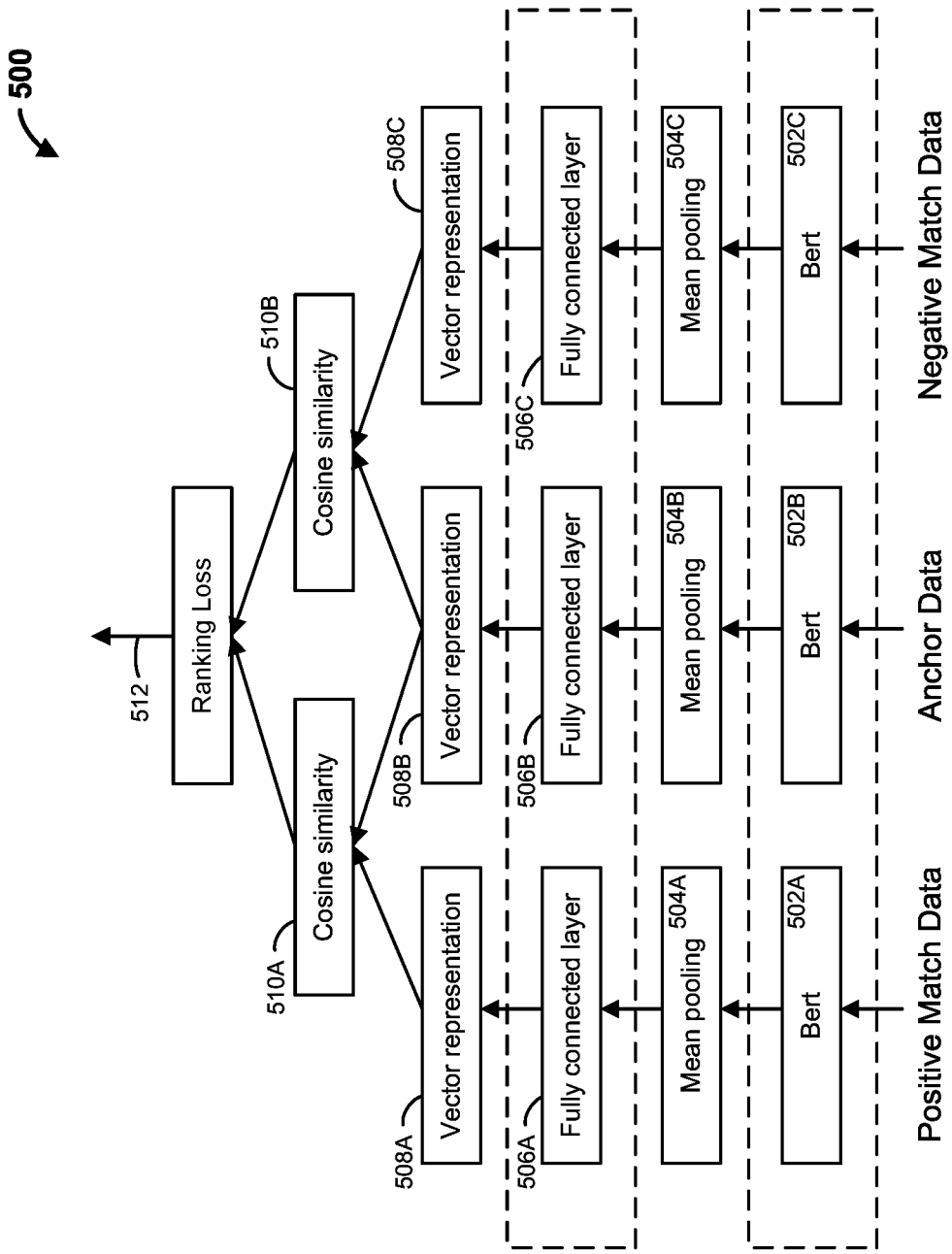
FIGS. 5A, 5B, and 6 illustrate exemplary machine learning processes in accordance with some embodiments.

FIG. 5A illustrates the training of a Siamese SBERT model 500 in accordance with some embodiments. Once trained, Siamese SBERT model 500 maps input data to output data characterizing a textual similarity between input features. In this example, Siamese SBERT model 500 includes a first BERT layer 502A, a second BERT layer 502B, and a third BERT layer 502C. The first BERT layer 502A, second BERT layer 502B, and third BERT layer 502C share a first number of weights, which may be adjusted during training. During training, second BERT layer 502B receives anchor data, which characterizes features (e.g., sentence embeddings) generated from textual information for first items of a training data set. Further, first BERT layer 502A receives positive match data, which characterizes features generated from textual information for second items from the training data set, where the features for the second items are positively correlated to the features for the first items (e.g., positively labelled features). In addition, third BERT layer 502C receives negative match data, which characterizes features generated from textual information for third items from the training data set, where the features for the third items are negatively correlated to the features for the first items (e.g., negatively labelled features).

First BERT layer 502A provides first output data to a first mean pooling layer 504A, while second BERT layer 502B provides second output data to a second mean pooling layer 504B and third BERT layer 502C provides third output data to a third mean pooling layer 504C.

First mean pooling layer 504A provides a first pooled output to first fully connected layer 506A. Similarly, second mean pooling layer 504B provides a second pooled output to second fully connected layer 506B, and third pooling layer 504C provides a third pooled output to third fully connected layer 506C. Each of first fully connected layer 506A, second fully connected layer 506B, and third fully connected layer 506C share a second number of weights, which may be adjusted during training. Further, first fully connected layer 506A, second fully connected layer 506B, and third fully connected layer 506C provide a vector representation of output data, including first vector representation 508A, second vector representation 508B, and third vector representation 508C, respectively.

Further, Siamese SBERT model 500 generates a first cosine similarity 510A between first vector representation 508A and second vector representation 508B, which characterizes a textual similarity between the first vector representation 508A and the second vector representation 508B. Siamese SBERT model 500 also generates a second cosine similarity 510B between second vector representation 508B and third vector representation 508C, which characterizes a textual similarity between the second vector representation 508B and the third vector representation 508C. Siamese SBERT model 500 further determines a ranking loss 512 based on the first cosine similarity 510A and the second cosine similarity 510B.

Figure 5B:
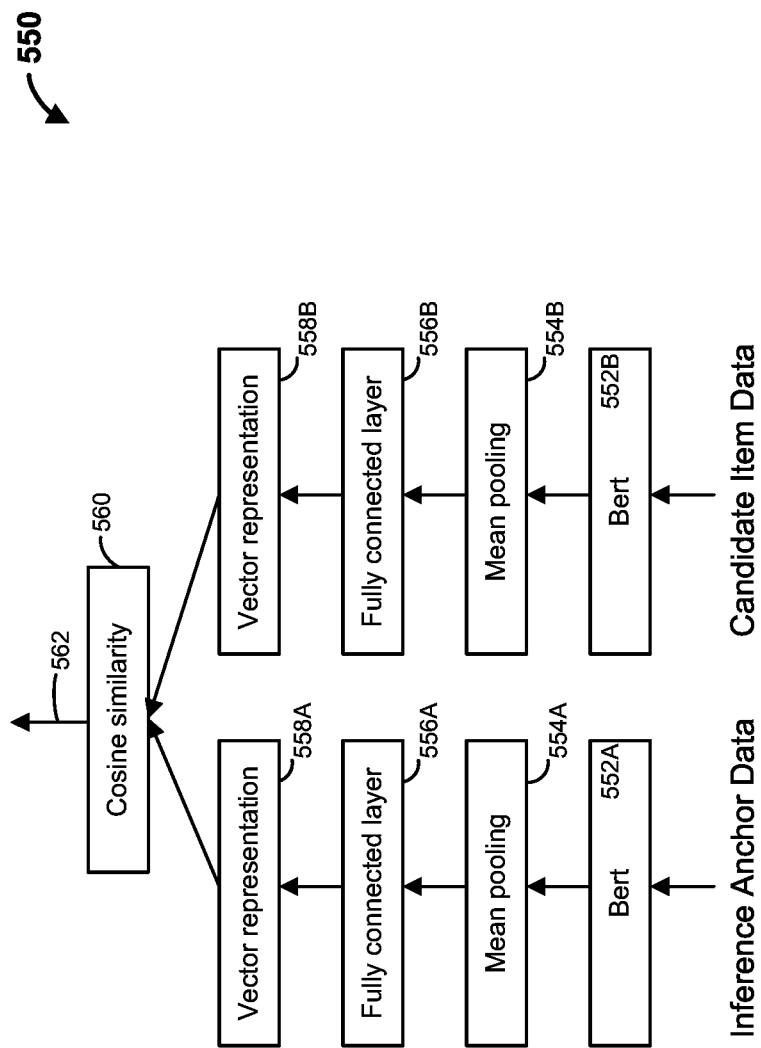

FIG. 5B illustrates a trained Siamese SBERT model 550, such as one trained in accordance with FIG. 5A. Trained Siamese SBERT model 550 includes a first BERT layer 552A that receives inference anchor data (e.g., third-party item data 330), as well as a first mean pooling layer 554A and a first fully connected layer 556A that provides a first vector representation 558A of output data. Trained Siamese SBERT model 550 also includes a second BERT layer 552B that receives candidate item data (e.g., catalog data 390 for an item), as well as a second mean pooling layer 554B and a second fully connected layer 556B that provides a second vector representation 558B of output data. Based on 558A and 558B, trained Siamese SBERT model 550 generates a cosine similarity 560, which may characterize a textual similarity between the inference anchor data and the candidate item data. Further, trained Siamese SBERT model 550 may generate a similarity score 562 based on the determined cosine similarity 560. For example, trained Siamese SBERT model 550 may scale the determined cosign similarity 560 to generate a similarity score within a range (e.g., a predetermined range, such as −1 to 1, or 0 to 1).

Figure 6:
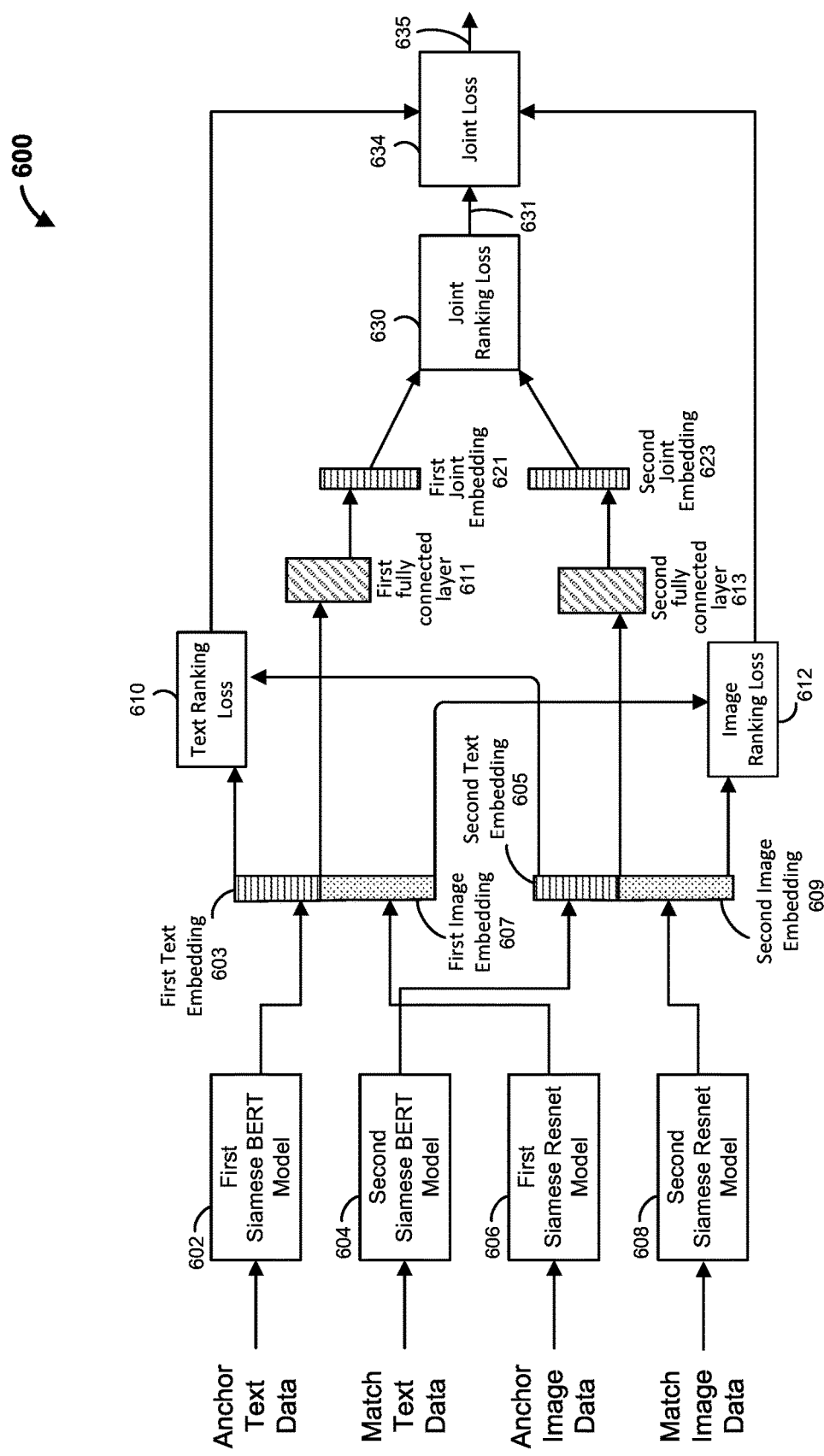

FIG. 6 illustrates multi-modal deep learning model 600 that operates on textual data and image data to determine item matches. Specifically, FIG. 6 illustrates the multi-modal deep learning model 600 during training. In this example, multi-modal deep learning model 600 includes a first Siamese BERT model 602 that receives anchor text data to generate a first text embedding 603. Anchor text data may include textual information, such as an item description, of an anchor item. Multi-modal deep learning model 600 also includes a second Siamese BERT model 604 that receives match text data (which may be positively, or negatively, labelled) and generates a second text embedding 605. Match text data may include textual information, such as an item description, of a candidate item (e.g., item to which the anchor item is being compared).

Further, multi-modal deep learning model 600 includes a first Siamese residual neural network (Resnet) model 606 that receives anchor image data to generate a first image embedding 607. Anchor image data may include, for example, one or more images of the anchor item. Multi-modal deep learning model 600 also includes a second Siamese Resnet model 608 that receives match image data to generate a second image embedding 609. Match image data may include, for example, one or more images of the candidate item.

As illustrated, a first fully connected layer 611 receives first text emhedding 603 and first image embedding 607, which may be concatenated into one vector, to generate a first joint embedding 621. Similarly, a second fully connected layer 613 receives second text emhedding 605 and second image embedding 609, which may be concatenated into one vector, to generate a second joint embedding 623.

Joint ranking loss module 630 generates a joint ranking loss 631 between first joint embedding 621 and second joint embedding 623. Further, text ranking loss module 610 generates a textual ranking loss between first text embedding 603 and second text embedding 605. Further, image ranking loss module 612 generates an image ranking loss between first image embedding 607 and second image embedding 609. Joint loss module 634 generates a final joint loss 635 based on the textual ranking loss, the image ranking loss, and the joint ranking loss. For example, joint loss module 634 may generate the final joint loss 635 according to the following equation:

$$\text{Joint loss} = \alpha * \text{text\_ranking\_loss} + \beta * \text{image\_ranking\_loss} + ¥ * \text{joint\_ranking\_loss};$$

Parameters $\alpha$, $\beta$, and $¥$ may be predetermined, and in some examples may be adjusted to increase, or decrease, a weighting of one or more of the text_ranking_loss, image_ranking_loss, and joint_ranking_loss. Item mapping computing device 102 may train the multi-modal deep learning model 600 until, for example, the joint loss is below a predetermined threshold.

Figure 7:
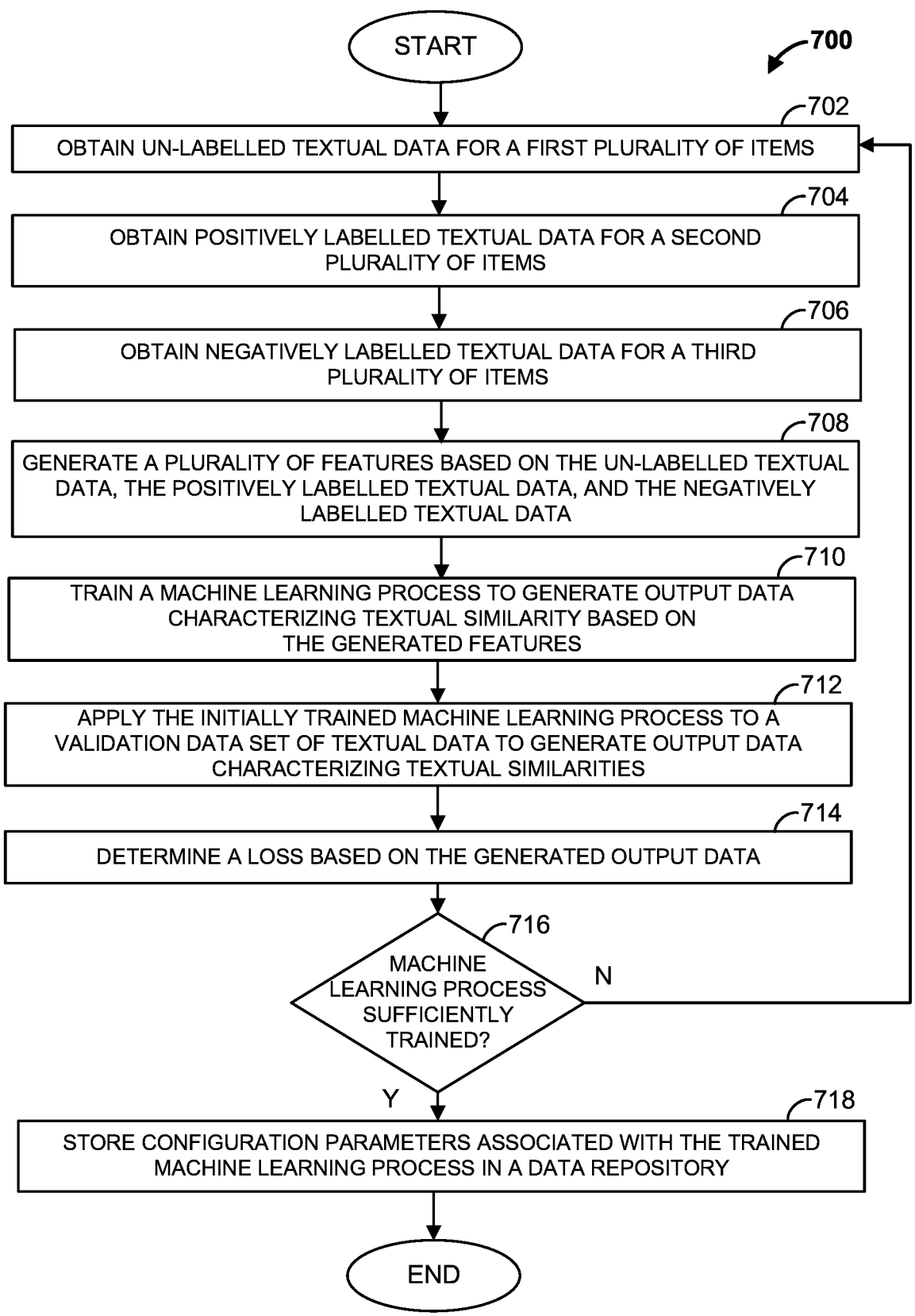
FIG. 7 is a flowchart of an example method that can be carried out by the item mapping system 100 of FIG. 1 in accordance with some embodiments.

FIG. 7 is a flowchart of an example method 700 that can be carried out by the item mapping computing device 102 of FIG. 1. Beginning at step 702, item mapping computing device 102 obtains unlabeled textual data for a first plurality of items. For example, item mapping computing device 102 may obtain catalog data 390 for each of the first plurality of items, where the catalog data 390 has not been labelled (e.g., positively or negatively). At step 704, item mapping computing device 102 obtains positively labelled textual data for a second plurality of items, and at step 706 obtains negatively labelled textual data for a third plurality of items. The obtained textual data for each of the first, second, and third plurality of items may include item descriptions, for example.

Proceeding to step 708, item mapping computing device 102 generates a plurality of features based on the unlabeled textual data, the positively labelled textual data, and the negatively labelled textual data. The plurality of features may include, for example, sentence embeddings generated for each of the unlabeled textual data, the positively labelled textual data, and the negatively labelled textual data. At step 710, item mapping computing device 102 trains a machine learning process to generate output data characterizing textual similarity based on the generated features. For example, item mapping computing device 102 may input generated features corresponding to unlabeled data, and to positively labelled data, to the machine learning process to generate the output data. Similarly, item mapping computing device 102 may input generated features corresponding to unlabeled data, and to negatively labelled data, to the machine learning process to generate the output data. The machine learning process may include, for example, the Siamese SBERT model, or multi-modal deep learning model, described herein.

At step 712, item mapping computing device 102 applies the initially trained machine learning process to a validation set of textual data to generate output data characterizing textual similarities. The validation set of textual data may include, for example, textual information for items not in the first plurality of items. At step 714, item mapping computing device 102 determines a loss, such as a ranking loss, based on the generated output data.

Further, and at step 716, item mapping computing device 102 determines whether the machine learning process is sufficiently trained based on the determined loss. For example, item mapping computing device 102 may determine whether the determined loss satisfies a predetermined threshold. If the determined loss does not satisfy the predetermined threshold (e.g., the determined loss is greater than the predetermined threshold), the method proceeds back to step 702, where additional textual data is obtained to continue training the machine learning process. Otherwise, if the determined loss does satisfy the threshold, the method proceeds to step 718.

At step 718, item mapping computing device 102 stores configuration parameters associated with the trained machine learning process in a data repository. For example, item mapping computing device 102 may store the configuration parameters as machine learning model data 380 within database 116. The method then ends.

Figure 8:
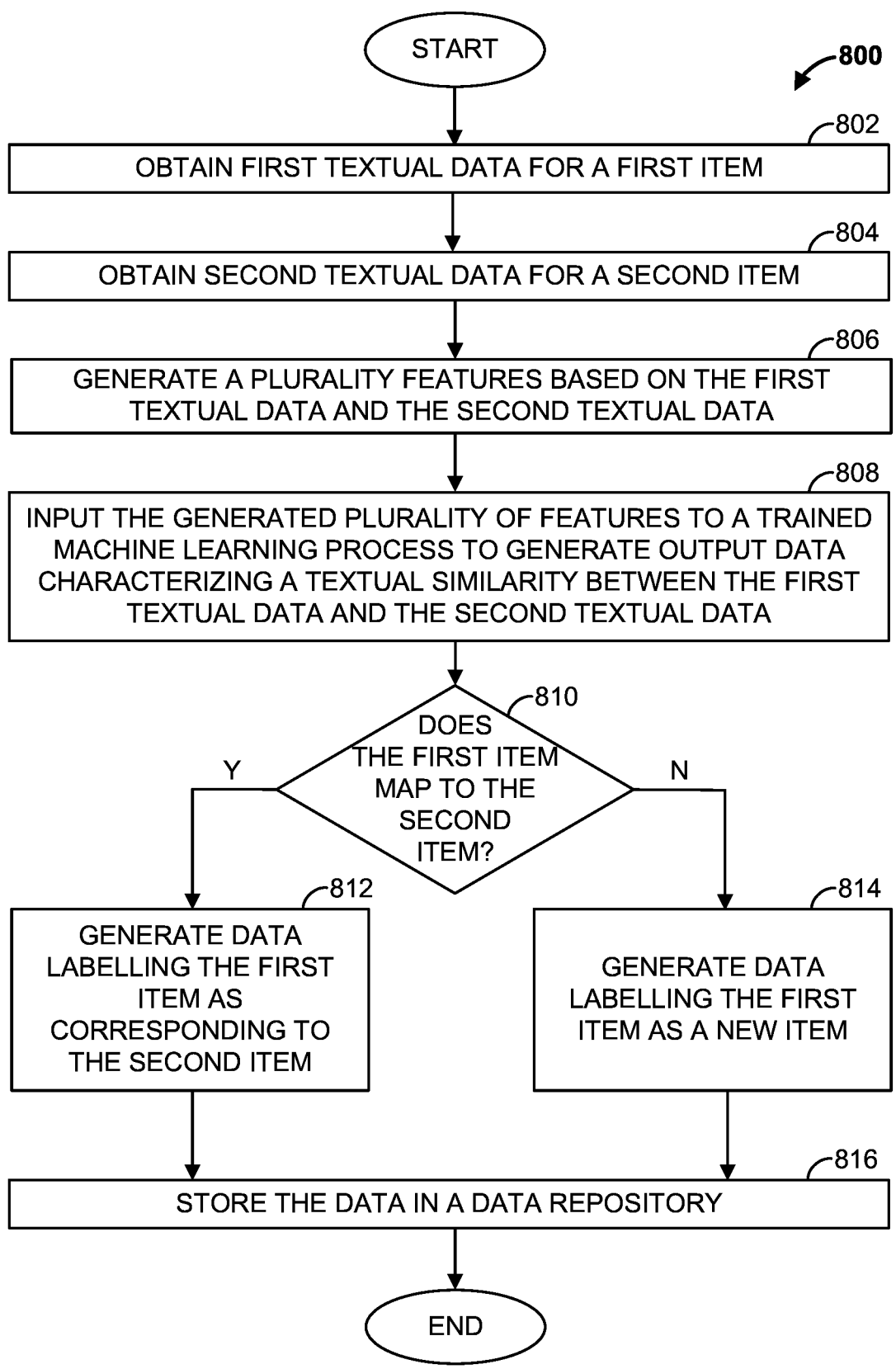
FIG. 8 is a flowchart of another example method that can be carried out by the item mapping system 100 of FIG. 1 in accordance with some embodiments.

FIG. 8 is a flowchart of an example method 800 that can be carried out by the item mapping computing device 102 of FIG. 1. Beginning at step 802, item mapping computing device 102 obtains first textual data for a first item. For example, item mapping computing device 102 may obtain third-party item data 330 that characterizes textual information for a third-party item. At step 804, item mapping computing device 102 obtains second textual data for a second item. For example, item mapping computing device 102 may catalog data 350 that characterizes textual information for an item currently sold at a retailers store, such as store 109, or on a website, such as one hosted by web server 104.

Proceeding to step 806, item mapping computing device 102 generates a plurality of features based on the first textual data and the second textual data. For example, item mapping computing device 102 may generate first sentence embeddings based on the first textual data, and second sentence embeddings based on the second textual data. At step 808, item mapping computing device 102 inputs the generated plurality of features to a trained machine learning process, such as a trained machine learning process trained as described with respect to FIG. 7. To generate output data. The output data characterizes a textual similarity between the first textual data and the second textual data. For example, the output data may include a similarity score as described herein.

Proceeding to step 810, item mapping computing device 102 determines whether the first item maps to the second item based on the generated output data. For example, item mapping computing device 102 may compare the similarity score to a predefined threshold. If the similarity score is the same as, or exceeds, the predetermined threshold, item mapping computing device 102 determines the first item maps to the second item. Otherwise, if the similarity score is below the predetermined threshold, item mapping computing device 102 determines that the first item does not map to the second item.

If item mapping computing device 102 determines the first item maps to the second item, the method proceeds to step 812, where item mapping computing device 102 generates data labelling the first item as corresponding to the second item (e.g., mapped flag 371 indicates the first item maps to the second item). If, at step 810, item mapping computing device 102 determines the first item does not map to the second item, the method proceeds to step 814, where item mapping computing device 102 generates data labelling the first item as anew item (e.g., mapped flag 371 indicates the first item is a new item). From steps 812 and 814, the method proceeds to step 816. At step 816, item mapping computing device 102 stores the generated data (e.g., the mapped flag 371) in a data repository, such as within database 116. The method may then end.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD- ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Further, although some of the machine learning processes are described herein as being trained with, and operating on during inference, features generated from product descriptions, in other examples the machine learning processes may be trained with, and operate on, features generated from any suitable item data, including any suitable item attributes (e.g., brand, color, packaging, category, etc.).

The following clause listing includes exemplary embodiments.

1. A system comprising:
    a computing device comprising at least one processor, where the computing device is configured to:
    obtain first textual data for a first item;
    obtain second textual data for a second item;
    generate a plurality of features based on the first textual data and the second textual data;
    input the generated plurality of features to a trained machine learning process to generate output data characterizing a textual similarity between the first textual data and the second textual data;
    determine whether the first item maps to the second item based on the output data;
    generate mapping data based on the determination; and
    store the mapping data in a data repository.
2. The system of clause 1, wherein the first textual data is an item description of the first item, and the second textual data is an item description of the second item.
3. The system of any of clauses 1-2, wherein inputting the generated plurality of features to the trained machine learning process comprises establishing a Sentence Bidirectional Encoder Representations from Transformers (SBERT) model.
4. The system of clause 3, wherein the SBERT model comprises a plurality of BERT layers that share a first number of weights, and a plurality of fully connected layers that share a second number of weights.
5. The system of clause 4, wherein the plurality of fully connected layers comprises a first fully connected layer and a second fully connected layer, and wherein the SBERT model generates a cosine similarity between a first output of the first fully connected layer and a second output of the second fully connected layer.
6. The system of any of clauses 1-5, wherein the output data comprises a similarity score characterizing the textual similarity between the first textual data and the second textual data.
7. The system of clause 6, wherein determining whether the first item maps to the second item comprises determining the similarity score satisfies a threshold.
8. The system of clause 6, wherein determining whether the first item maps to the second item comprises:
    determining the similarity score does not satisfy a threshold; and
    in response, determining a second similarity score characterizing a textual similarity between an attribute of each of the first item and the second item.
9. The system of clause 8, wherein determining the second similarity score comprises determining whether the second similarity score satisfies a second threshold.
10. The system of any of clauses 1-9, wherein the computing device is configured to:
    obtain first image data for the first item;
    obtain second image data for the second item;
    generate a second plurality of features based on the first image data and the second image data; and
    input the generated second plurality of features to the trained machine learning process to generate the output data.
11. A method comprising:
    obtaining first textual data for a first item;
    obtaining second textual data for a second item;
    generating a plurality of features based on the first textual data and the second textual data;
    inputting the generated plurality of features to a trained machine learning process to generate output data characterizing a textual similarity between the first textual data and the second textual data;
    determining whether the first item maps to the second item based on the output data;
    generating mapping data based on the determination; and
    storing the mapping data in a data repository.
12. The method of clause 11, wherein the first textual data is an item description of the first item, and the second textual data is an item description of the second item.
13. The method of any of clauses 11-12, wherein inputting the generated plurality of features to the trained machine learning process comprises establishing a Sentence Bidirectional Encoder Representations from Transformers (SBERT) model.
14. The method of clause 13, wherein the SBERT model comprises a plurality of BERT layers that share a first number of weights, and a plurality of fully connected layers that share a second number of weights.
15. The method of clause 14, wherein the plurality of fully connected layers comprises a first fully connected layer and a second fully connected layer, and wherein the SBERT model generates a cosine similarity between a first output of the first fully connected layer and a second output of the second fully connected layer.
16. The method of any of clauses 11-15, wherein the output data comprises a similarity score characterizing the textual similarity between the first textual data and the second textual data.
17. The method of clause 6, wherein determining whether the first item maps to the second item comprises determining the similarity score satisfies a threshold.
18. The method of clause 6, wherein determining whether the first item maps to the second item comprises:
    determining the similarity score does not satisfy a threshold; and
    in response, determining a second similarity score characterizing a textual similarity between an attribute of each of the first item and the second item.
19. The method of clause 18, wherein determining the second similarity score comprises determining whether the second similarity score satisfies a second threshold.
20. The method of any of clauses 11-19 comprising:
    obtaining first image data for the first item;
    obtaining second image data for the second item;

generating a second plurality of features based on the first image data and the second image data; and
inputting the generated second plurality of features to the trained machine learning process to generate the output data.

21. A non-transitory computer readable medium having instructions stored thereon, wherein the instructions, when executed by at least one processor, cause a device to perform operations comprising:
obtaining first textual data for a first item;
obtaining second textual data for a second item;
generating a plurality of features based on the first textual data and the second textual data;
inputting the generated plurality of features to a trained machine learning process to generate output data characterizing a textual similarity between the first textual data and the second textual data;
determining whether the first item maps to the second item based on the output data;
generating mapping data based on the determination; and
storing the mapping data in a data repository.

22. The non-transitory computer readable medium of clause 21, wherein the first textual data is an item description of the first item, and the second textual data is an item description of the second item.

23. The non-transitory computer readable medium of any of clauses 21-22, wherein inputting the generated plurality of features to the trained machine learning process comprises establishing a Sentence Bidirectional Encoder Representations from Transformers (SBERT) model.

24. The non-transitory computer readable medium of clause 23, wherein the SBERT model comprises a plurality of BERT layers that share a first number of weights, and a plurality of fully connected layers that share a second number of weights.

25. The non-transitory computer readable medium of clause 24, wherein the plurality of fully connected layers comprises a first fully connected layer and a second fully connected layer, and wherein the SBERT model generates a cosine similarity between a first output of the first fully connected layer and a second output of the second fully connected layer.

26. The non-transitory computer readable medium of any of clauses 21-25, wherein the output data comprises a similarity score characterizing the textual similarity between the first textual data and the second textual data.

27. The non-transitory computer readable medium of clause 26, wherein determining whether the first item maps to the second item comprises determining the similarity score satisfies a threshold.

28. The non-transitory computer readable medium of clause 26, wherein determining whether the first item maps to the second item comprises:
determining the similarity score does not satisfy a threshold; and
in response, determining a second similarity score characterizing a textual similarity between an attribute of each of the first item and the second item.

29. The non-transitory computer readable medium of clause 28, wherein determining the second similarity score comprises determining whether the second similarity score satisfies a second threshold.

30. The non-transitory computer readable medium of any of clauses 21-29 comprising:
obtaining first image data for the first item;
obtaining second image data for the second item;
generating a second plurality of features based on the first image data and the second image data; and
inputting the generated second plurality of features to the trained machine learning process to generate the output data.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device comprising at least one processor, where the computing device is configured to:
obtain first textual data from an item description of a first item;
obtain second textual data from an item description of a second item;
generate a plurality of features based on the first textual data and the second textual data, wherein each feature corresponds to a vector representation generated based on the item description of the first item or the second item;
input the generated plurality of features to a trained machine learning model to generate output data comprising a first similarity score characterizing a textual similarity of item descriptions between the first textual data and the second textual data, wherein the trained machine learning model is trained based on features generated from catalog data of a plurality of items and trained until at least one metric threshold is satisfied;
determine whether the first item maps to the second item based on:
determining whether the first similarity score representing a description similarity between the first item and the second item satisfies a first threshold,
in accordance with a determination that the first similarity score representing a description similarity between the first item and the second item does not satisfy the first threshold, determining a second similarity score representing an attribute similarity between the first item and the second item and characterizing a string similarity between an attribute of each of the first item and the second item, wherein the attribute includes at least one of a brand, a color, a packaging or a category of each of the first item and the second item;
generate mapping data based on the determination of whether the first item maps to the second item; and
store the mapping data in a data repository.

2. The system of claim 1, wherein the first textual data is an item description of the first item, and the second textual data is an item description of the second item.

3. The system of claim 1, wherein inputting the generated plurality of features to the trained machine learning model comprises establishing a Sentence Bidirectional Encoder Representations from Transformers (SBERT) model.

4. The system of claim 3, wherein the SBERT model comprises a plurality of BERT layers that share a first number of weights, and a plurality of fully connected layers that share a second number of weights.

5. The system of claim 4, wherein the plurality of fully connected layers comprises a first fully connected layer and a second fully connected layer, and wherein the SBERT model generates a cosine similarity between a first output of the first fully connected layer and a second output of the second fully connected layer.

6. The system of claim 1, wherein determining the second similarity score comprises determining whether the second similarity score satisfies a second threshold.

7. The system of claim 1, wherein the computing device is configured to:
obtain first image data for the first item;
obtain second image data for the second item;
generate a second plurality of features based on the first image data and the second image data; and
input the generated second plurality of features to the trained machine learning model to generate the output data.

8. A method comprising:
obtaining first textual data from an item description of a first item;
obtaining second textual data from an item description of a second item;
generating a plurality of features based on the first textual data and the second textual data, wherein each feature corresponds to a vector representation generated based on the item description of the first item or the second item;
inputting the generated plurality of features to a trained machine learning model to generate output data comprising a first similarity score characterizing a textual similarity between of item descriptions between the first textual data and the second textual data, wherein the trained machine learning model is trained based on features generated from catalog data of a plurality of items and trained until at least one metric threshold is satisfied;
determining whether the first item maps to the second item based on:
determining whether the first similarity score representing a description similarity between the first item and the second item satisfies a first threshold,
in accordance with a determination that the first similarity score representing a description similarity between the first item and the second item does not satisfy the first threshold, determining a second similarity score representing an attribute similarity between the first item and the second item and characterizing a string similarity between an attribute of each of the first item and the second item, wherein the attribute includes at least one of a brand, a color, a packaging or a category of each of the first item and the second item;
generating mapping data based on the determination of whether the first item maps to the second item; and
storing the mapping data in a data repository.

9. The method of claim 8 wherein inputting the generated plurality of features to the trained machine learning model comprises establishing a Sentence Bidirectional Encoder Representations from Transformers (SBERT) model.

10. The method of claim 9 wherein the plurality of fully connected layers comprises a first fully connected layer and a second fully connected layer, and wherein the SBERT model generates a cosine similarity between a first output of the first fully connected layer and a second output of the second fully connected layer.

11. The method of claim 8 wherein determining the second similarity score comprises determining whether the second similarity score satisfies a second threshold.

12. The method of claim 8 comprising:
obtaining first image data for the first item;
obtaining second image data for the second item;
generating a second plurality of features based on the first image data and the second image data; and
inputting the generated second plurality of features to the trained machine learning model to generate the output data.

13. A non-transitory computer readable medium having instructions stored thereon, wherein the instructions, when executed by at least one processor, cause a device to perform operations comprising:
obtaining first textual data from an item description of a first item;
obtaining second textual data from an item description of a second item;
generating a plurality of features based on the first textual data and the second textual data, wherein each feature corresponds to a vector representation generated based on the item description of the first item or the second item;
inputting the generated plurality of features to a trained machine learning model to generate output data comprising a first similarity score characterizing a textual similarity between of item descriptions between the first textual data and the second textual data, wherein the trained machine learning model is trained based on features generated from catalog data of a plurality of items and trained until at least one metric threshold is satisfied;
determining whether the first item maps to the second item based on:
determining whether the first similarity score representing a description similarity between the first item and the second item satisfies a first threshold,
in accordance with a determination that the first similarity score representing a description similarity between the first item and the second item does not satisfy the first threshold, determining a second similarity score representing an attribute similarity between the first item and the second item and characterizing a string similarity between an attribute of each of the first item and the second item, wherein the attribute includes at least one of a brand, a color, a packaging or a category of each of the first item and the second item;
generating mapping data based on the determination of whether the first item maps to the second item; and
storing the mapping data in a data repository.

14. The non-transitory computer readable medium of claim 13, wherein the trained machine learning model comprises establishing a Sentence Bidirectional Encoder Representations from Transformers (SBERT) model.

* * * * *